United States Patent
Joo et al.

(10) Patent No.: US 11,364,924 B2
(45) Date of Patent: Jun. 21, 2022

(54) DEVICE AND METHOD FOR CONTROLLING SUDDEN UNINTENDED ACCELERATION

(71) Applicants: HYUNDAI MOTOR COMPANY, Seoul (KR); KIA MOTORS CORPORATION, Seoul (KR)

(72) Inventors: Moon Kyung Joo, Seoul (KR); Jin Kuk Cho, Hwaseong-si (KR); Ji Hyun Park, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 65 days.

(21) Appl. No.: 16/819,986

(22) Filed: Mar. 16, 2020

(65) Prior Publication Data
US 2021/0139039 A1    May 13, 2021

(30) Foreign Application Priority Data
Nov. 12, 2019  (KR) ......................... 10-2019-0144601

(51) Int. Cl.
*B60W 50/02*   (2012.01)
*B60W 40/105*  (2012.01)
(Continued)

(52) U.S. Cl.
CPC ...... *B60W 50/0205* (2013.01); *B60W 10/188* (2013.01); *B60W 10/26* (2013.01);
(Continued)

(58) Field of Classification Search
CPC ........... B60W 50/0205; B60W 10/188; B60W 10/26; B60W 40/105; B60W 50/038; B60W 2050/021; B60W 2050/0292; B60W 2510/083; B60W 2520/105; B60W 50/029; B60W 2050/022; B60W 2050/0295; B60W 10/08; B60W 50/045; B60W 2540/10;
(Continued)

(56) References Cited

U.S. PATENT DOCUMENTS

| | | | | |
|---|---|---|---|---|
| 2011/0022284 A1* | 1/2011 | Umakoshi | ............. | B60W 50/06 701/70 |
| 2015/0081183 A1* | 3/2015 | Schueler | ............... | B60W 10/04 701/53 |
| 2015/0081192 A1* | 3/2015 | Pongracz | .......... | B60W 50/0205 701/99 |

FOREIGN PATENT DOCUMENTS

| CN | 111762058 | * | 4/2019 |
|---|---|---|---|
| CN | 111762058 A | * | 10/2020 |

(Continued)

*Primary Examiner* — Muhammad Shafi
(74) *Attorney, Agent, or Firm* — McDonnell Boehnen Hulbert & Berghoff LLP (57) ABSTRACT

A device for controlling sudden unintended acceleration according to an embodiment of the present disclosure includes a sensor for detecting a current acceleration of a vehicle, a first controller that calculates a motor torque command value for driving a motor, calculates an expected acceleration of the vehicle based on the motor torque command value, and compares the expected acceleration with the current acceleration, and a second controller that compares the motor torque command value with a preset value. Therefore, the device may determine a cause of the sudden unintended acceleration and block the sudden unintended acceleration based on the determination result to improve safety of a driver.

18 Claims, 5 Drawing Sheets

(51) Int. Cl.
   *B60W 50/029* (2012.01)
   *B60W 50/038* (2012.01)
   *B60W 10/26* (2006.01)
   *B60W 10/188* (2012.01)

(52) U.S. Cl.
   CPC ........ *B60W 40/105* (2013.01); *B60W 50/029* (2013.01); *B60W 50/038* (2013.01); *B60W 2050/021* (2013.01); *B60W 2050/0292* (2013.01); *B60W 2510/083* (2013.01); *B60W 2520/105* (2013.01)

(58) Field of Classification Search
   CPC ... B60W 30/18009; B60W 2510/0657; B60W 10/18; B60W 40/107; B60L 2240/16; B60L 2240/20; B60L 2240/423; B60L 3/0084; B60L 3/04; B60L 15/20; B60L 58/10; B60Q 1/46; Y02T 10/64; Y02T 10/70; Y02T 10/72; B60K 28/14; B60K 28/10; B60K 2028/006; B60Y 2200/91; B60Y 2306/15; B60Y 2400/304
   USPC .................................................. 701/29, 29.2
   See application file for complete search history.

(56) References Cited

FOREIGN PATENT DOCUMENTS

| JP | 2000-312444 | * | 11/2000 | |
|---|---|---|---|---|
| JP | 2000312444 A | * | 11/2000 | |
| JP | 6260707 | * | 4/2017 | |
| JP | 6260707 B2 | * | 1/2018 | ................ B60L 9/18 |
| KR | 101251529 | * | 4/2013 | |
| KR | 101251529 B1 | * | 4/2013 | .............. B60L 58/14 |
| KR | 2019-0056534 A |  | 5/2019 | |

* cited by examiner

DEVICE AND METHOD FOR CONTROLLING SUDDEN UNINTENDED ACCELERATION

CROSS REFERENCE TO RELATED APPLICATIONS

This application claims the benefit of priority to Korean Patent Application No. 10-2019-0144601, filed in the Korean Intellectual Property Office on Nov. 12, 2019, the entire contents of which are incorporated herein by reference.

TECHNICAL FIELD

The present disclosure relates to a device and a method for controlling sudden unintended acceleration.

BACKGROUND

Recently, as interest in environmental pollution has emerged, a development of eco-friendly vehicles, that is, electric vehicles, are actively underway. The electric vehicle drives a motor and uses the motor as a power source, and has a battery that is charged by an external power source to drive the motor.

Further, sudden unintended acceleration of the vehicle means a state in which speed of the vehicle increases rapidly due to a driver's misoperation or a vehicle defect and the vehicle is not normally braked. The electric vehicle generally does not have a transmission, so that control for stopping the power source is required. Therefore, it is necessary to develop a technology for determining a controller that causes the sudden unintended acceleration in the electric vehicle, and blocking the sudden unintended acceleration.

SUMMARY

The present disclosure has been made to solve the above-mentioned problems occurring in the prior art while advantages achieved by the prior art are maintained intact.

An aspect of the present disclosure provides a device and a method for controlling sudden unintended acceleration that may determine a controller causing the sudden unintended acceleration in an electric vehicle and block the sudden unintended acceleration based on the determination result.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for controlling sudden unintended acceleration includes a sensor for detecting a current acceleration of a vehicle, a first controller that calculates a motor torque command value for driving a motor, calculates an expected acceleration of the vehicle based on the motor torque command value, and compares the expected acceleration with the current acceleration, and a second controller that compares the motor torque command value with a preset value.

In one embodiment, the first controller may determine whether the second controller has failed based on the result of comparing the expected acceleration with the current acceleration.

In one embodiment, the first controller may determine that the second controller has failed when the current acceleration exceeds the expected acceleration for a first time or over.

In one embodiment, the first controller may control a battery management system (BMS) to turn off a main relay of a battery when determining that the second controller is failed.

In one embodiment, the first controller may control hydraulic braking after turning off the main relay of the battery.

In one embodiment, the second controller may determine whether the first controller has failed based on the result of comparing the motor torque command value with the preset value.

In one embodiment, the second controller may determine that the first controller has failed when the motor torque command value exceeds the preset value for a second time or over.

In one embodiment, the second controller may not control the motor with the motor torque command value received from the first controller when determining that the first controller has failed.

In one embodiment, the second controller may set a torque for driving the motor to zero when determining that the first controller has failed.

In one embodiment, the second controller may control hydraulic braking after setting a torque for driving the motor to zero.

According to an aspect of the present disclosure, a method for controlling sudden unintended acceleration includes calculating, by a first controller, a motor torque command value for driving a motor, and calculating an expected acceleration of a vehicle based on the motor torque command value, obtaining a current acceleration of the vehicle, comparing, by a second controller, the motor torque command value with a preset value, and determining whether the first controller or the second controller has failed based on the comparison result.

In one embodiment, the determining of whether the first controller or the second controller has failed may include determining that the first controller has failed when the motor torque command value exceeds the preset value for a second time or over.

In one embodiment, the method may further include setting a torque for driving the motor to zero when determining that the first controller has failed.

In one embodiment, the method may further include, after the setting of the torque for driving the motor to zero, controlling hydraulic braking.

In one embodiment, the comparing, by the second controller, of the motor torque command value with the preset value may further include comparing, by the first controller, the expected acceleration with the current acceleration when the motor torque command value does not exceed the preset value.

In one embodiment, the determining of whether the first controller or the second controller has failed may include determining, by the first controller, that the second controller has failed when the current acceleration exceeds the expected acceleration.

In one embodiment, the method may further include controlling a battery management system to turn off a main relay of a battery when determining that the second controller has failed.

In one embodiment, the method may further include, after the controlling to turn off the main relay of the battery, controlling hydraulic braking.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
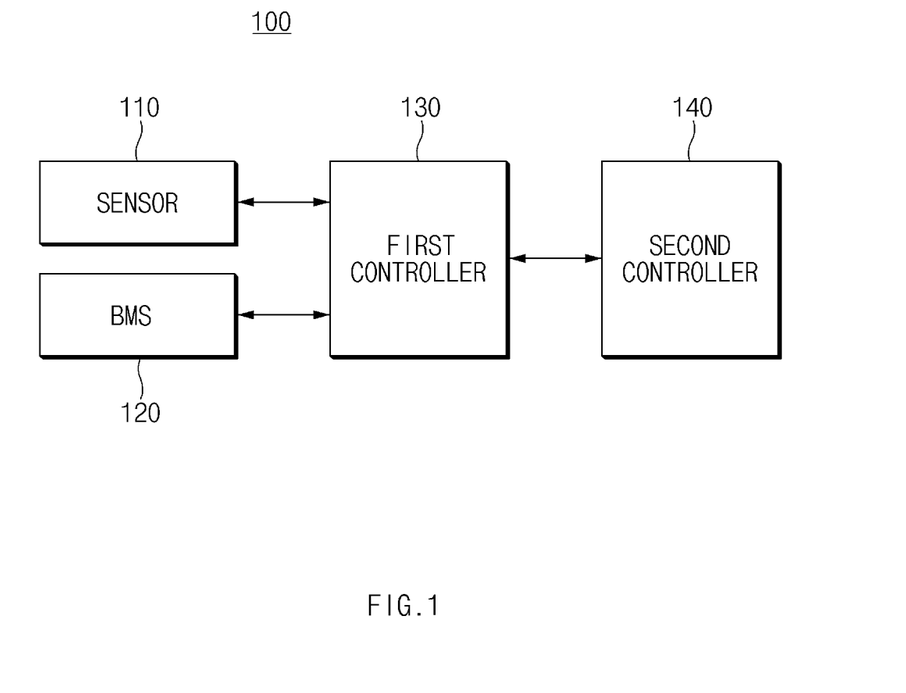
FIG. 1 is a view illustrating a configuration of a device for controlling sudden unintended acceleration according to an embodiment of the present disclosure.

FIG. 1 is a view illustrating a configuration of a device for controlling sudden unintended acceleration according to an embodiment of the present disclosure.

As shown in FIG. 1, a sudden unintended acceleration controlling device 100 according to an embodiment of the present disclosure may include a sensor 110, a battery management system (BMS) 120, a first controller 130, and a second controller 140. In this connection, the first controller 130 may include a vehicle control unit (VCU), and the second controller 140 may include a motor control unit (MCU).

The sensor 110 may detect information of a vehicle. In this connection, the information of the vehicle may include driving information of the vehicle. For example, the sensor 110 may detect a degree of pressing of an accelerator pedal by a user, and resulting traveling speed, acceleration, and the like of the vehicle. To this end, the sensor 110 may include an accelerator pedal sensor, a speed sensor, and an acceleration sensor.

The battery management system 120 may monitor a voltage, a current, and a temperature of a battery (not shown), maintain the battery in an optimal state, and calculate available power of the battery and state of charge (SOC) information of the battery.

The first controller 130 may include the vehicle control unit (VCU), and may control overall operations for traveling of the vehicle. To this end, the first controller 130 may receive the degree of pressing of the accelerator pedal by the user from the sensor 110 to calculate a driver required torque, and may receive the speed of the vehicle and the like from the sensor 110 to calculate a traveling load. In this connection, the driver required torque is preferably understood as will of a driver, and the traveling load may mean a resistance received by the vehicle. In addition, the first controller 130 may calculate a motor torque command value required to drive a motor based on the driver required torque and the traveling load. The first controller 130 reflects the traveling load in calculating the motor torque command value to offset the resistance received by the vehicle such that the motor may be driven at the driver's will. In this connection, the motor torque command value is preferably understood as a command value for driving the motor. Therefore, the first controller 130 may calculate the driver required torque as a sum of the motor torque command value and the traveling load.

In addition, the first controller 130 may calculate an expected acceleration of the vehicle based on a calculated value of a change in the speed of the vehicle (change in the speed during a predetermined time) driven by the motor torque command value reflecting the traveling load. In addition, the first controller 130 may calculate an expected angular acceleration of the motor based on the motor torque command value.

The second controller 140 may include the motor control unit (MCU), and may control overall operations for driving the motor. The second controller 140 may receive the motor torque command value calculated from the first controller 130, and may control to drive the motor based on the received motor torque command value. In addition, the second controller 140 may calculate a driving torque and an angular acceleration of the motor driven based on the received motor torque command value.

Hereinafter, operations of the first controller 130 and the second controller 140 for the sudden unintended acceleration controlling device to determine whether sudden unintended acceleration has occurred will be described in more detail. In a case of an electric vehicle, the sudden unintended acceleration may occur when there is a failure in the first controller 130 or the second controller 140. Thus, according to an embodiment, whether the sudden unintended acceleration has occurred may be determined based on whether the first controller 130 or the second controller 140 fails. Further, whether the first controller 130 has failed may be determined by the second controller 140, and whether the second controller 140 has failed may be determined by the first controller 130.

According to an embodiment, the first controller 130 may compare the expected acceleration and a current acceleration of the vehicle sensed from the sensor 110, and determine whether the second controller 140 has failed based on the comparison result. Specifically, when the current acceleration exceeds the expected acceleration, the first controller 130 may determine that the second controller 140 has failed. According to an embodiment, when it is determined that the current acceleration exceeds the expected acceleration for a first time or over, the first controller 130 may determine that the second controller 140 has failed. That is, when the second controller 140 does not control the driving of the motor based on the motor torque command value, but controls the motor to be driven at an instantaneous maximum output, the current acceleration detected by the sensor 110 may exceed the expected acceleration calculated by the first controller 130. Further, when determining that the time when the current acceleration exceeds the expected acceleration is maintained for the first time or over, the first controller 130 may determine that the second controller 140 has failed. According to another embodiment, when it is determined that the current acceleration of the vehicle detected by the sensor 110 exceeds a sum of a tolerance range constant α and the expected acceleration calculated by the first controller 130, the first controller 130 may determine that the second controller 140 has failed. In this connection, the tolerance range constant may be set by a developer.

In addition, the second controller 140 may compare the motor torque command value received from the first controller 130 with a preset value, and determine whether the first controller 130 has failed based on the comparison result. Specifically, when the motor torque command value received from the first controller 130 exceeds the preset value for a second time or over, the second controller 140 may determine that the first controller 130 has failed. In this connection, the preset value may be a reference value for determining whether the motor torque command value is a value at which the motor is not able to be controlled. When the motor torque command value received from the first controller 130 exceeds the preset value, the motor torque command value may be out of a normal control range. As described above, when receiving the motor torque command value out of the normal control range, the second controller 140 may determine that the first controller 130 has failed.

Hereinafter, operations of the first controller 130 and the second controller 140 for blocking the sudden unintended acceleration after the sudden unintended acceleration controlling device determines the sudden unintended acceleration according to an embodiment of the present disclosure will be described in more detail.

When determining by the above-described operation that the second controller 140 has failed, the first controller 130 may control the battery management system 120 to turn off a main relay of the battery. That is, the first controller 130 may determine that the motor is abnormally controlled due to the failure of the second controller 140, so that the first controller 130 may turn off the main relay of the battery to essentially cut off power supply for driving the motor. Because of the cut off of the power supply, the first controller 130 may stop a behavior of the motor, and the motor to which the power supply is cut off may not be able to deliver additional power to drive-wheels, so that the sudden unintended acceleration of the vehicle may be blocked. In addition, the first controller 130 may further control hydraulic braking to block the sudden unintended acceleration of the vehicle.

When determining by the above-described operation that the first controller 130 has failed, the second controller 140 may not control the motor with the motor torque command value received from the first controller 130. That is, because the second controller 140 may determine that an abnormal motor torque command value is received due to the failure of the first controller 130, the second controller 140 may not control the motor with the received motor torque command value. In addition, the second controller 140 may set a torque for driving the motor to '0' to control the motor, so that the motor may not deliver additional power to the drive-wheels. This may block the sudden unintended acceleration of the vehicle. In addition, the second controller 140 may additionally control the hydraulic braking to block the sudden unintended acceleration of the vehicle.

Figure 2A:
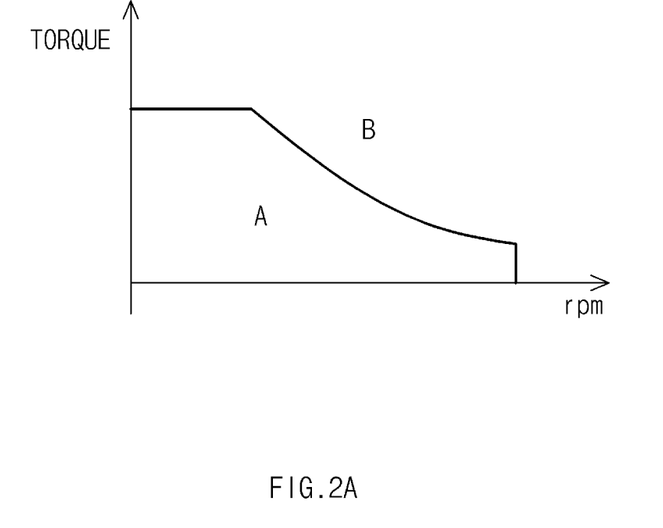
FIGS. 2A and 2B are vehicle driving graphs from which a failure of a first controller may be determined according to an embodiment of the present disclosure.
Figure 2B:
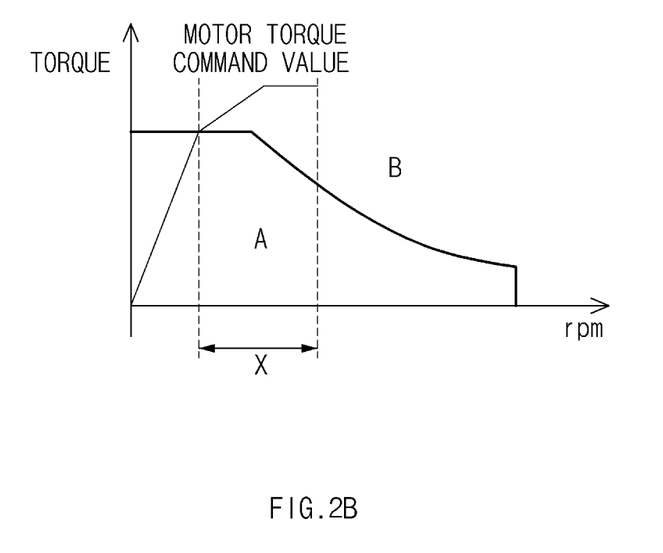

FIGS. 2A and 2B are vehicle driving graphs from which a failure of a first controller may be determined according to an embodiment of the present disclosure.

As shown in FIG. 2A, the second controller 140 may determine a range in which the normal control of the motor driving is available as 'A' based on the motor torque command value for normally controlling the driving of the motor. In addition, a region 'B' out the range of the 'A' may be determined to be a range in which the normal control of the motor driving is not available. Thus, when the motor torque command value received from the first controller 130 is in the range of the 'A', the second controller 140 may determine that the normal control of the motor driving is available.

Further, as shown in FIG. 2B, the second controller 140 may determine that the motor torque command value is abnormal for a X section in which the motor torque command value received from the first controller 130 has a value in the 'B' region out of the range of the 'A'. In this case, the second controller 140 may determine that the first controller 130 has failed.

Figure 3A:
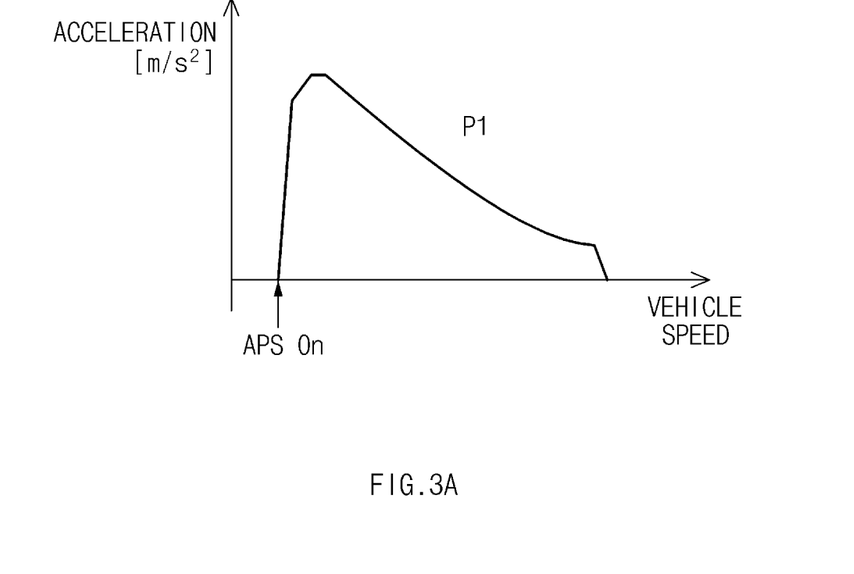
FIGS. 3A and 3B are vehicle driving graphs from which a failure of a second controller may be determined according to an embodiment of the present disclosure.
Figure 3B:
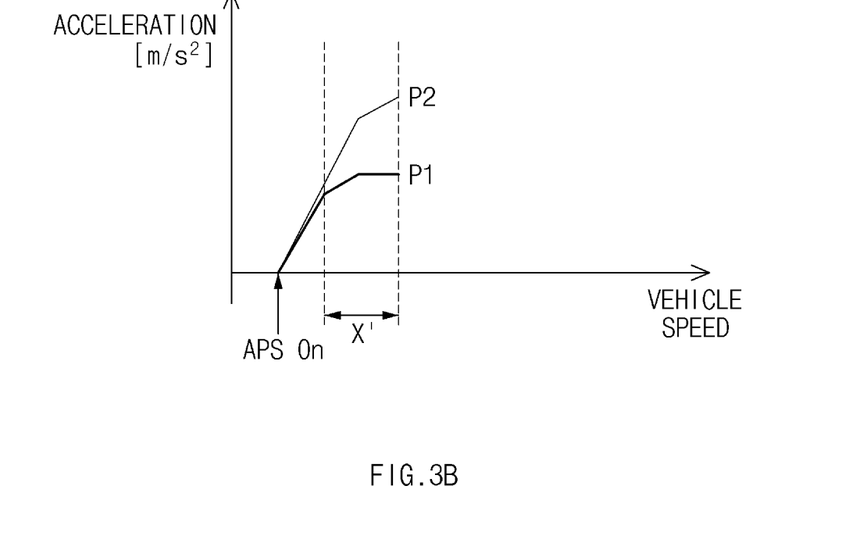

FIGS. 3A and 3B are vehicle driving graphs from which a failure of a second controller may be determined according to an embodiment of the present disclosure.

As shown in FIG. 3A, when the vehicle travels by the driving of the motor based on the motor torque command value at which the driving of the motor may be normally controlled, the first controller 130 may indicate a calculated expected acceleration as 'P1'. In this connection, an APS On time point is preferably understood as a time when the user presses the accelerator pedal.

Further, as shown in FIG. 3B, when, although the first controller 130 transmitted the motor torque command value at which the driving of the motor may be normally controlled to the second controller 140, the motor is not driven based on the motor torque command value and the second controller 140 controls the motor to operate at the instantaneous maximum output, and thus, the current acceleration of the vehicle detected from the sensor 110 is 'P2', the current acceleration exceeds the expected acceleration in an 'X' section, so that the first controller 130 may determine that the second controller 140 has failed.

Figure 4:
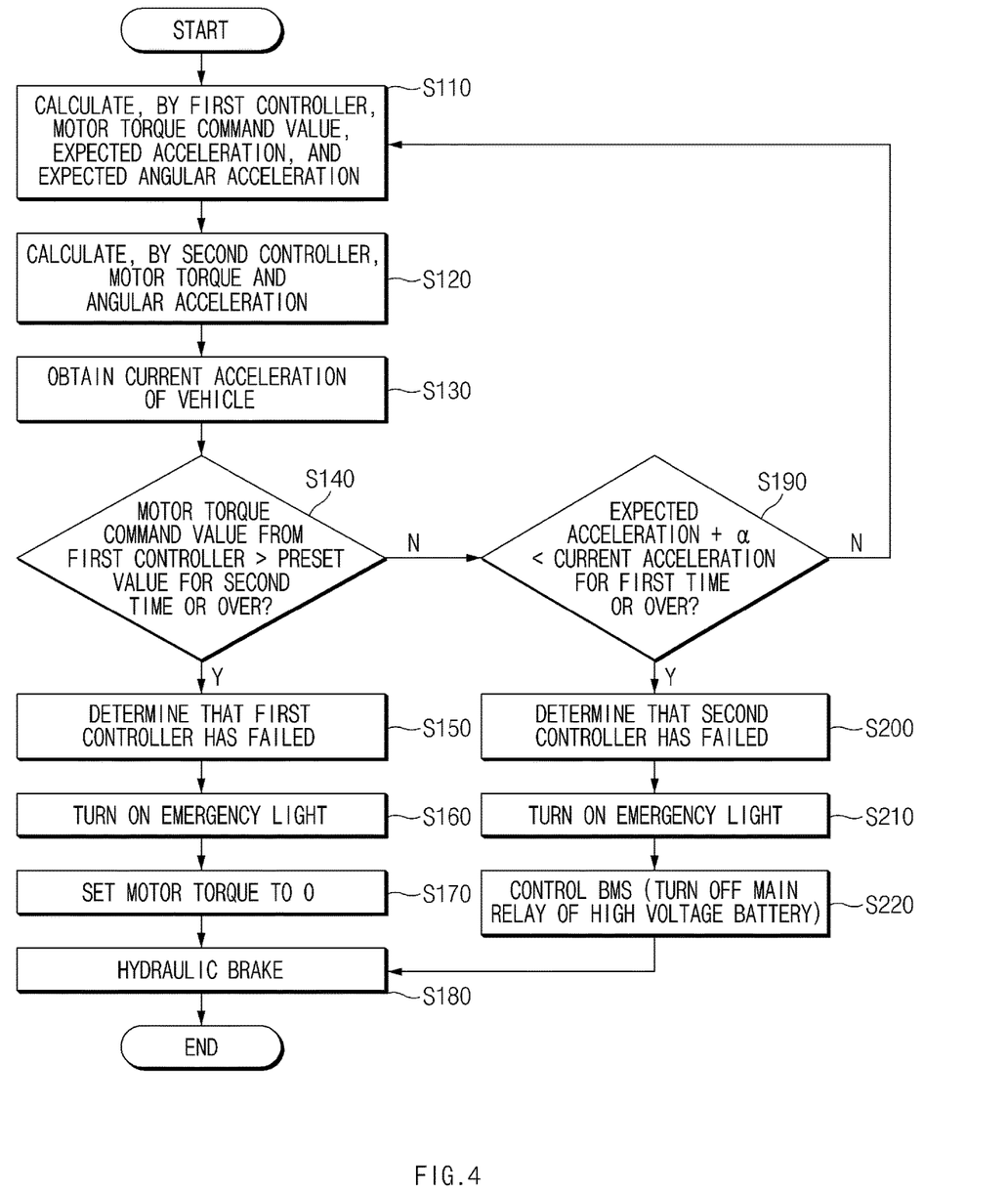
FIG. 4 is a flowchart illustrating a method for controlling sudden unintended acceleration according to an embodiment of the present disclosure.

FIG. 4 is a flowchart illustrating a method for controlling sudden unintended acceleration according to an embodiment of the present disclosure.

As shown in FIG. 4, the first controller 130 may calculate the motor torque command value, and calculate the expected acceleration of the vehicle and the expected angular acceleration of the motor based on the calculated motor torque command value (S110). In S110, the first controller 130 may receive the degree of pressing of the accelerator pedal by the user from the sensor 110 and calculate the driver required torque. Further, the first controller 130 may receive the speed and the like of the vehicle from the sensor 110 and calculate the traveling load. In this connection, the driver required torque is preferably understood as the will of the driver, and the traveling load may mean the resistance received by the vehicle. In addition, the first controller 130 may calculate the motor torque command value required to drive the motor based on the driver required torque and the traveling load. In addition, the first controller 130 may calculate the expected acceleration of the vehicle based on the calculated value of the change in the speed of the vehicle (the change in the speed during the predetermined time) driven by the motor torque command value. In addition, the first controller 130 may calculate the expected angular acceleration of the motor based on the motor torque command value.

The second controller 140 calculates the motor torque and the angular acceleration of the motor driven based on the motor torque command value received from the first controller 130 (S120).

The first controller 130 obtains the current acceleration of the vehicle sensed from the sensor 110 (S130).

The second controller 140 may compare the motor torque command value received from the first controller 130 with the preset value, and determine whether the motor torque command value received from the first controller 130 exceeds the preset value for the second time or over (S140). In this connection, the preset value may be the reference value for determining whether the motor torque command value is the value at which the motor is not able to be controlled.

In S140, when the motor torque command value received from the first controller 130 exceeds the preset value for the second time or over (Y), the second controller 140 may determine that the first controller 130 has failed (S150).

When determining that the first controller 130 has failed, the second controller 140 controls to turn on an emergency light (S160), and the second controller 140 sets the motor torque to 0 (S170). That is, in S170, the second controller 140 may not control the motor at the motor torque command value calculated by the first controller 130 in S110, but control the motor by setting the motor torque to 0 to prevent the motor from delivering the additional power to the drive-wheels, thereby blocking the sudden unintended acceleration of the vehicle. In addition, the second controller 140 may control the hydraulic braking to block the sudden unintended acceleration of the vehicle (S180).

On the other hand, in S140, when the second controller 140 determines that the motor torque command value received from the first controller 130 does not exceed the preset value for the second time or over (N), the first controller 130 compares the expected acceleration calculated in S110 with the current acceleration of the vehicle sensed from the sensor 110, and determines whether the current acceleration exceeds the expected acceleration (S190). In S190, the first controller 130 may determine whether the current acceleration of the vehicle obtained in S130 exceeds the sum of the tolerance range constant α and the expected acceleration calculated by the first controller 130.

When determining in S190 that the current acceleration exceeds the expected acceleration (Y), the first controller 130 determines that the second controller 140 has failed (S200). On the other hand, when determining in S190 that the current acceleration does not exceed the expected acceleration (N), the first controller 130 performs S110 again.

When determining that the second controller 140 has failed, the first controller 130 may control to turn on the emergency light (S210) and control the battery management system 120 to turn off the main relay of the battery (S220). In S220, the first controller 130 may determine that the motor is abnormally controlled due to the failure of the second controller 140, so that the first controller 130 may turn off the main relay of the battery to essentially cut off the power supply for driving the motor. Because of the cut off of the power supply, the first controller 130 may stop the behavior of the motor, and the motor to which the power supply is cut off may not be able to deliver the additional power to the drive-wheels, so that the sudden unintended acceleration of the vehicle may be blocked. In addition, the first controller 130 may further control the hydraulic braking to block the sudden unintended acceleration of the vehicle (S180).

Figure 5:
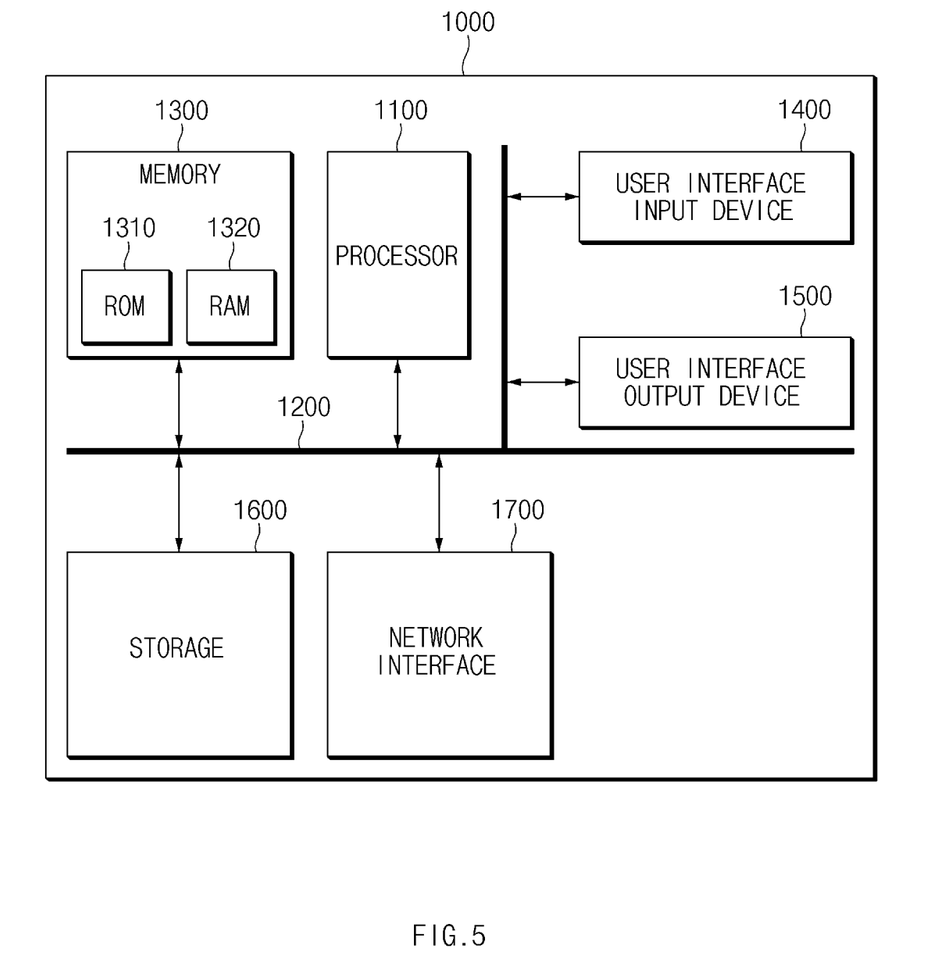
FIG. 5 illustrates a computing system in which a method according to an embodiment of the present disclosure is implemented.

FIG. 5 illustrates a computing system in which a method according to an embodiment of the present disclosure is implemented.

Referring to FIG. 5, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The description above is merely illustrative of the technical idea of the present disclosure, and various modifications and changes may be made by those skilled in the art without departing from the essential characteristics of the present disclosure.

Therefore, the embodiments disclosed in the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The device and the method for controlling the sudden unintended acceleration according to an embodiment of the present disclosure may determine the controller causing the sudden unintended acceleration and block the sudden unintended acceleration based on the determination result to improve safety of the driver.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A device for controlling sudden unintended acceleration, the device comprising:
a sensor for detecting a current acceleration of a vehicle;
a first controller configured to:
calculate a motor torque command value for driving a motor;
calculate an expected acceleration of the vehicle based on the motor torque command value; and
compare the expected acceleration with the current acceleration; and
a second controller configured to compare the motor torque command value with a preset value;
wherein the expected acceleration is calculated based on a calculated value of a change in the speed of the vehicle during a predetermined time; and
wherein the preset value includes a reference value for determining whether the motor torque command value is a value at which the motor is not able to be controlled.

2. The device of claim 1, wherein the first controller is configured to determine whether the second controller has failed based on the result of comparing the expected acceleration with the current acceleration.

3. The device of claim 2, wherein the first controller is configured to determine that the second controller has failed when the current acceleration exceeds the expected acceleration for a first time or over.

4. The device of claim 3, wherein the first controller is configured to control a battery management system (BMS) to turn off a main relay of a battery when determining that the second controller has failed.

5. The device of claim 4, wherein the first controller is configured to control hydraulic braking after turning off the main relay of the battery.

6. The device of claim 4, wherein the second controller is configured to determine that the first controller has failed when the motor torque command value exceeds the preset value for a second time or over.

7. The device of claim 6, wherein the second controller is configured to not control the motor with the motor torque command value received from the first controller when determining that the first controller has failed.

8. The device of claim 7, wherein the second controller is configured to set a torque for driving the motor to zero when determining that the first controller has failed.

9. The device of claim 7, wherein the second controller is configured to control hydraulic braking after setting a torque for driving the motor to zero.

10. The device of claim 1, wherein the second controller is configured to determine whether the first controller has failed based on the result of comparing the motor torque command value with the preset value.

11. A method for controlling sudden unintended acceleration, the method comprising:
calculating, by a first controller, a motor torque command value for driving a motor, and calculating an expected acceleration of a vehicle based on the motor torque command value;
obtaining a current acceleration of the vehicle;
comparing, by a second controller, the motor torque command value with a preset value; and
determining whether the first controller or the second controller has failed based on the comparison result;
wherein the expected acceleration is calculated, by the first controller, based on a calculated value of a change in the speed of the vehicle during a predetermined time; and
wherein the preset value includes a reference value for determining whether the motor torque command value is a value at which the motor is not able to be controlled.

12. The method of claim 11, wherein the determining of whether the first controller or the second controller has failed includes:
determining that the first controller has failed when the motor torque command value exceeds the preset value for a second time or over.

13. The method of claim 11, further comprising:
setting a torque for driving the motor to zero when determining that the first controller has failed.

14. The method of claim 13, further comprising:
after the setting of the torque for driving the motor to zero, controlling hydraulic braking.

15. The method of claim 11, wherein the comparing, by the second controller, of the motor torque command value with the preset value further includes:
comparing, by the first controller, the expected acceleration with the current acceleration when the motor torque command value does not exceed the preset value.

16. The method of claim 15, wherein the determining of whether the first controller or the second controller has failed includes:
determining, by the first controller, that the second controller has failed when the current acceleration exceeds the expected acceleration.

17. The method of claim 16, further comprising:
controlling a battery management system to turn off a main relay of a battery when determining that the second controller has failed.

18. The method of claim 17, further comprising:
after the controlling to turn off the main relay of the battery, controlling hydraulic braking.

* * * * *